Patented Sept. 16, 1952

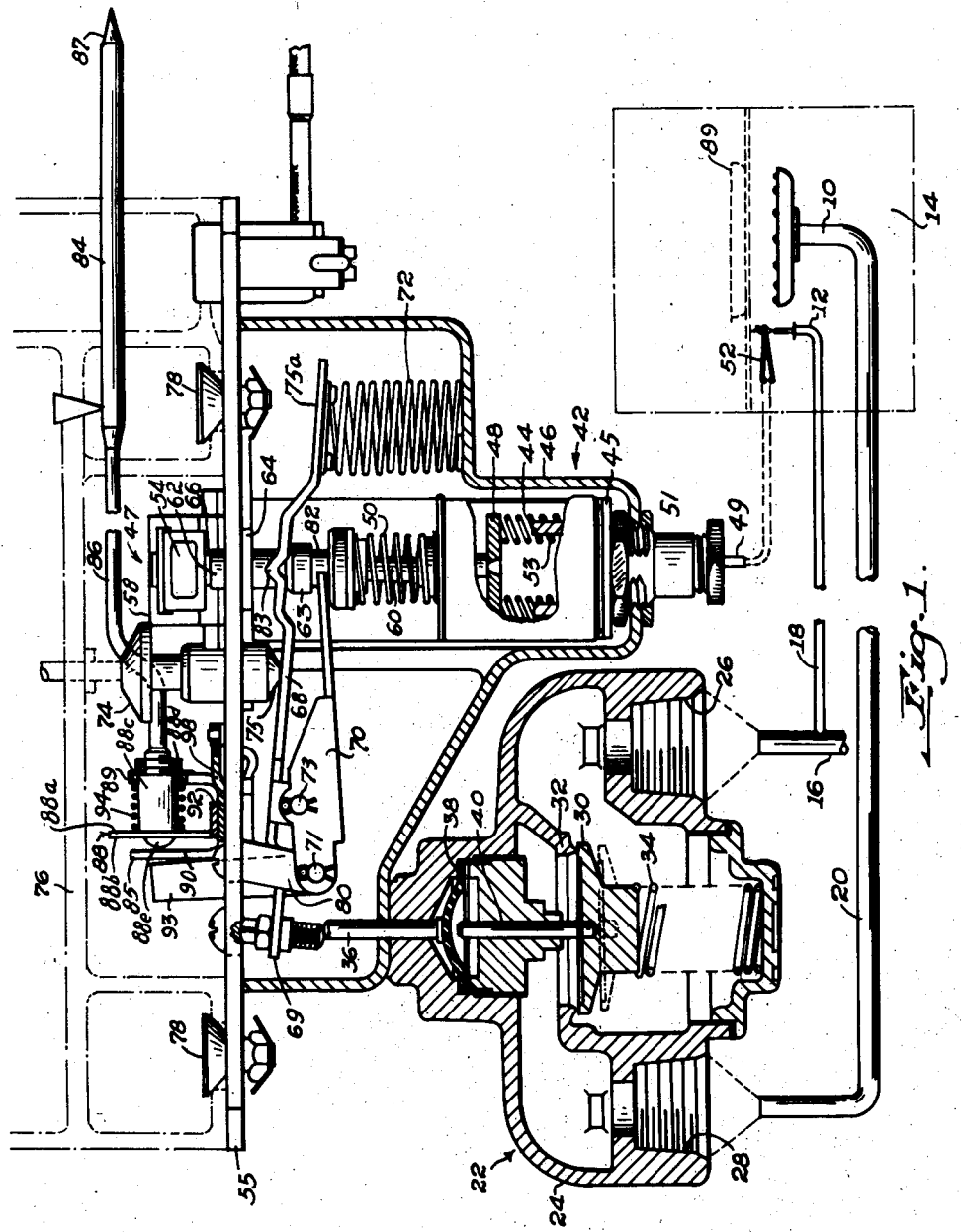

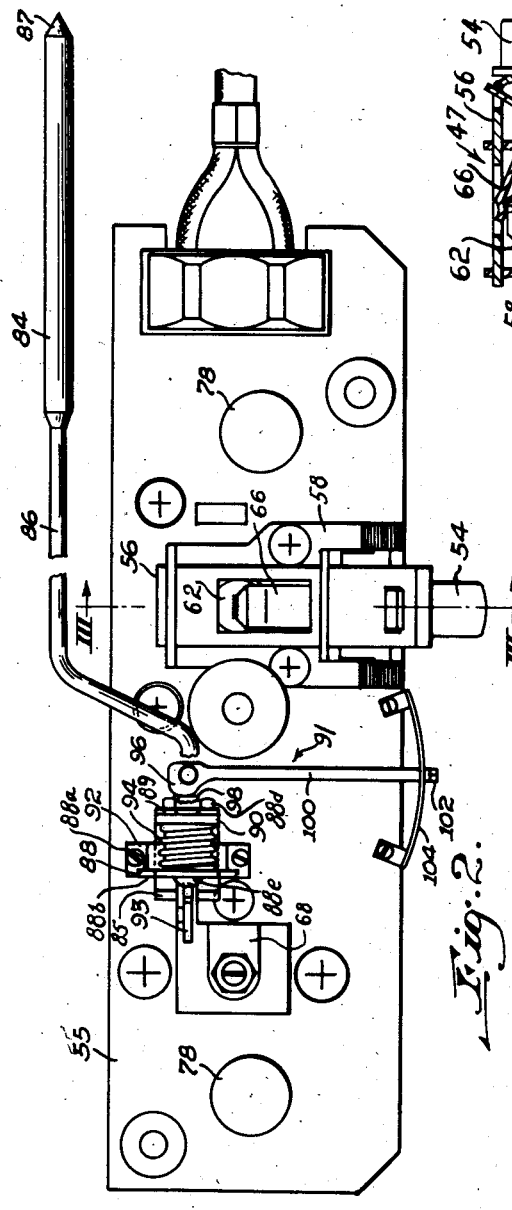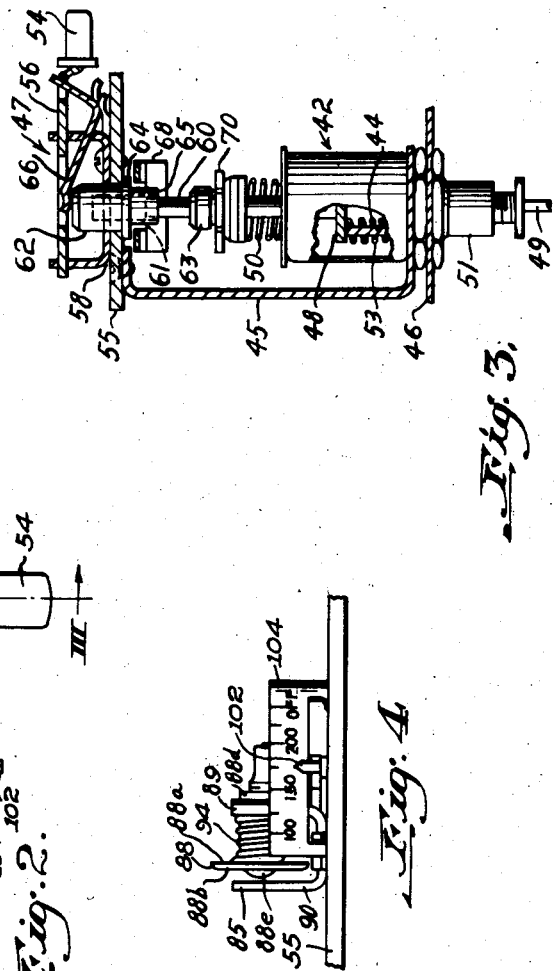

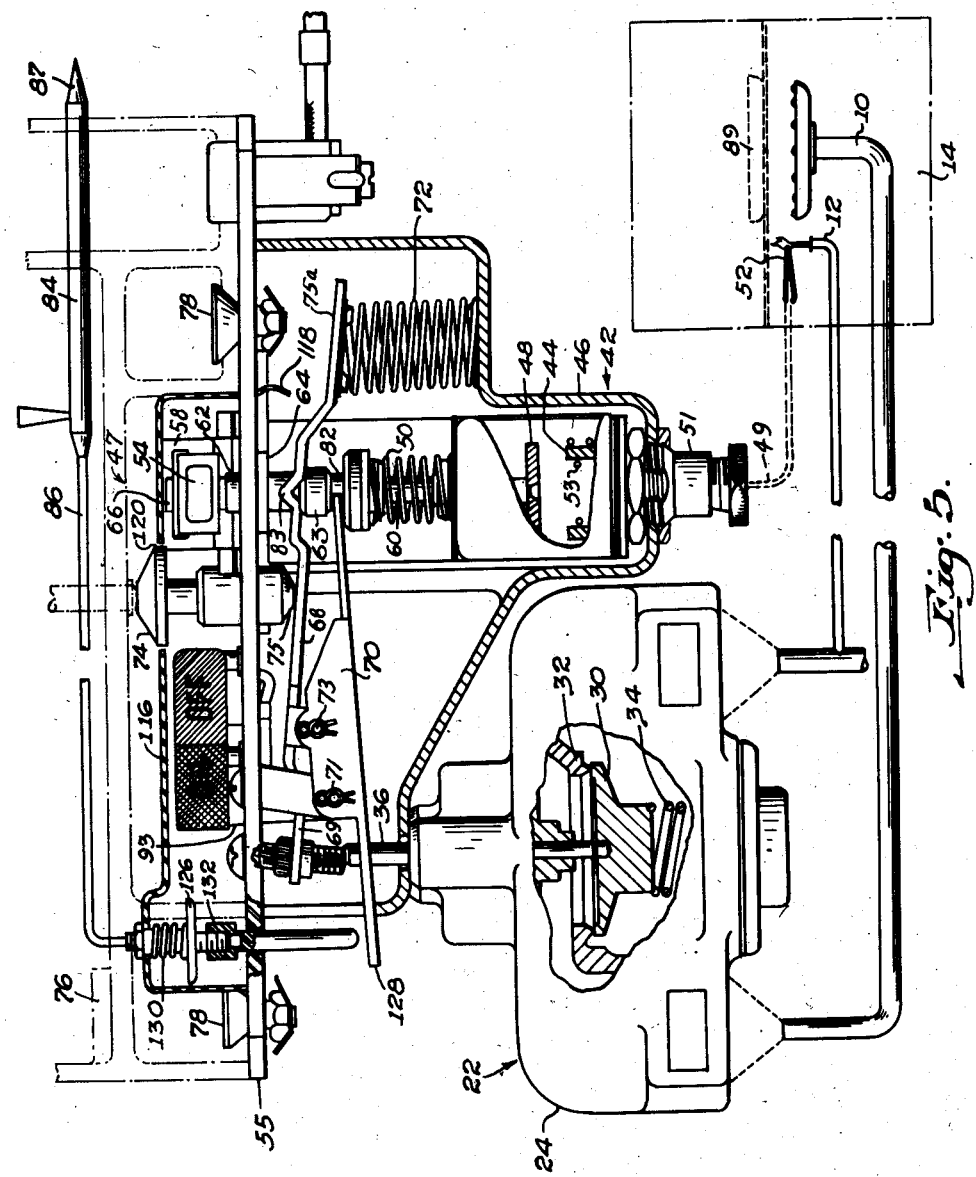

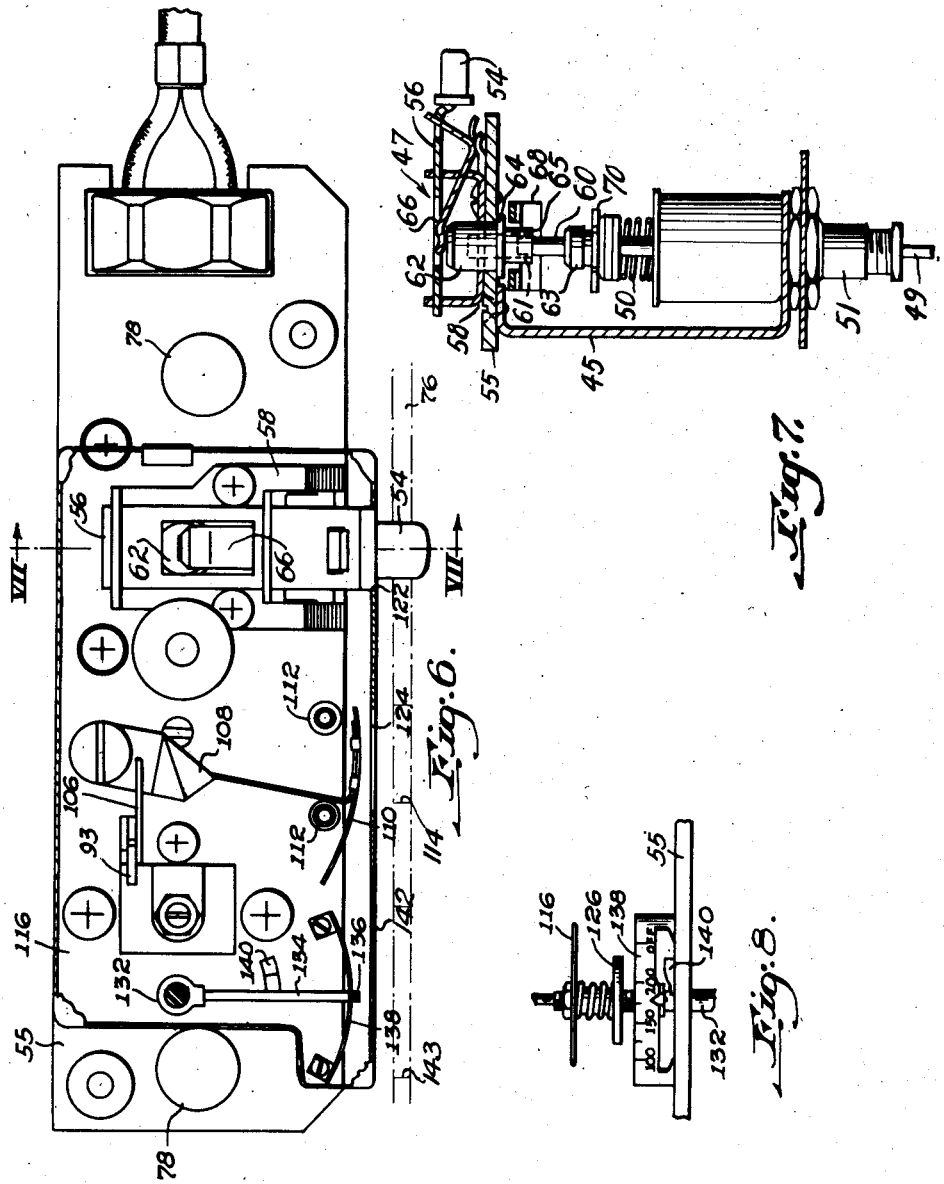

2,610,678

UNITED STATES PATENT OFFICE 2,610,678

TEMPERATURE CONTROL DEVICE

Samuel G. Eskin and Harold W. Rice, Los Angeles, Calif., assignors to Robertshaw-Fulton Controls Company, a corporation of Delaware Application March 13, 1947, Serial No. 734,392

4 Claims. (Cl. 158—127)

This invention relates to control devices for heating appliances and, more particularly, to devices responsive to the internal temperature of the contents of a container supported in the appliance.

It has long been known that in the roasting of meat and other foods it is advantageous to automatically control both the temperature and time of cooking. It is still necessary, however, that the time required for cooking be estimated in order that the clock or other timer be set. Such procedure may lead to overcooking or undercooking due to the difficulty of correctly estimating the time with roasts of different sizes and types of meat. Moreover, with frozen foods it is extremely difficult to estimate the correct cooking time.

It has been established that the internal temperature of the food is an accurate indication of the progress of the cooking. Thus, if two roasts of different sizes but of the same type of meat, such as beef, are each cooked until the internal temperature reaches a given value it will be found that the two roasts are similar in characteristics of doneness. Also, it has been found that some meats, such as pork, must be cooked until a definite minimum internal temperature is reached in order to render the meat safe for human consumption.

It is desirable, therefore, to provide means for controlling roasting operation according to the internal temperatures rather than according to an estimated time. Meat thermometers provided with a skewer point for insertion of the bulb center in the center portion of the meat being cooked have been proposed. In Patent No. 2,364,841 there is disclosed an improvement upon these ordinary meat thermometers in that the dial is mounted on the exterior of the oven while the free movement of the bulb to different locations in the oven compartment is retained. In such devices, however, there is no connection between the meat thermometer and the oven heat control.

An object of this invention is to combine control of the heating appliance with means responsive to a selected internal temperature of the contents of a container supported in the appliance.

Another object of this invention is to operate the heating device of a cooking appliance under control of a device responsive to a selected internal temperature of the food in the oven.

Another object of the invention is to render the internal temperature responsive device independent of the usual oven heat control means.

Another object of the invention is to ensure automatic turn-off of the oven heat at a preselected internal temperature of the food irrespective of its original temperature.

Another object of the invention is to secure highly accurate control over the cooking processes.

Another object of the invention is to eliminate the customary involved computations of cooking time by the cook.

Another object of the invention is to permit adjustment of the internal temperature responsive device from the exterior of the appliance.

Another object of the invention is to set the appliance in operation by means of a clock or other timer, to control the temperature of the oven by thermostatic means and to shut off the oven heat at the preselected internal temperature by separate means without interference with the safety or other controlling devices.

Other objects and advantages will become apparent from the following description taken in connection with the accompanying drawings, wherein:

Fig. 1 is a front elevation partly in longitudinal section of the combined safety and timing control having the internal temperature responsive device combined therewith;

Fig. 2 is a top plan view of the structure shown in Fig. 1;

Fig. 3 is a fragmentary partial section taken on the line III—III of Fig. 2 but showing the parts in another position and on a smaller scale;

Fig. 4 is a front elevation of a detail;

Fig. 5 is a front elevation, partly in longitudinal section, similar to Fig. 1 but showing a modified form of the invention;

Fig. 6 is a top plan view of the structure shown in Fig. 5;

Fig. 7 is a fragmentary partial section taken on the line VII—VII of Fig. 6 but with the parts positioned similarly to Fig. 3 and on a similarly smaller scale; and Fig. 8 is a front elevation of a detail.

Referring more particularly to the drawing, the heating appliance to which this invention is applied may consist of the usual domestic gas range having a main burner 10 and a constant burning pilot burner 12 both located within the oven compartment 14 indicated in broken lines in the drawing. A fuel supply pipe 16 supplies fuel to the pilot burner 12 by way of a conduit 18 and also to the main burner 10 by a fuel supply pipe 20 under control of a control means 22.

The control means 22 comprises a generally rectangular hollow body 24 having an inlet opening 26 and an outlet opening 28 for connection with the fuel pipes 16 and 20 respectively. A valve member 30 is cooperable with a valve seat 32 to control flow of the fuel between the openings 26 and 28 and is normally biased to closed position by a coil spring 34. The valve member 30 is movable away from the seat 32 by pressure applied to the projecting end of an operating stem 36 which abuts one side of a sealing diaphragm 38 having a valve stem 40 abutting the opposite side thereof and connected to the valve member 30.

A safety control device 42 for the control means 22 includes electromagnetic means comprising a horseshoe magnet 44 rigidly mounted on a bracket 45 supported within a housing 46 extending on one side of the control means 22 and to which the latter is secured. An armature member 48 is adapted to be moved into attracted position with the pole faces of the magnet 44 against the bias of a coil spring 50. A magnetic force sufficient to retain the armature 48 in attracted position is established by a thermocouple 52 which is exposed to a flame from the pilot burner 12 and serves when sufficiently heated thereby to energize a winding 53 for the horseshoe magnet 44. Electric current is conducted from the thermocouple 52 to the winding 53 by leads 49 and a suitable connection 51 carried by the housing 46. It may be noted that the current so generated is sufficient to retain the armature 48 in attracted position but is insufficient to actuate the armature 48 to this position. Consequently, manual resetting means, indicated generally by the reference numeral 47 and now to be described, are employed to place the armature 48 in attracted position and render the safety device effective.

The housing 46, which carries the control means 22 and the safety device 42, is secured to the underside of a support plate 55. The resetting means referred to are positioned together with the internal temperature control device of this invention on the opposite side of the support plate 55. Thus, the parts on the underside may be hidden from view by the backguard or other structural part of the range while those on the opposite side are exposed. A cover (not shown) may be provided for these exposed parts if desired.

The resetting means, as shown more clearly in Fig. 3, comprise a push-button 54 which is secured on one end of a slide-bar 56 supported in a U-shaped plate 58 secured to the support plate 55 on the side opposite the safety device 42. A reset stem 60 is connected to the armature 48 and, as shown in Fig. 3, is slidingly received in a recess 61 formed in a thrust button 62 which projects through the support plate 55. The button 62 is provided with a collar 64 which is adapted to abut the underside of the support plate 55 as will hereinafter be described. The telescopic arrangement between the reset stem 60 and the button 62 permits an enlargement 63 of the reset stem 60 to abut the adjacent end face 65 of the button 62 in one position and to be separated therefrom in another position. Manual pressure applied to the push-button 54 is transmitted to the button 62 by a bell-crank lever 66 which is adapted for pivotal movement on the U-shaped support 58.

A lever device comprising a pair of lever arms 68 and 70 supported in the housing 46 serves to transmit movement of the safety device 42 to the control means 22. The lever arm 68 is pivoted intermediate its ends on a pin 73 carried by the lever arm 70 and extends from the axis of the control means 22 to beyond the axis of the safety device 42. The lever arm 68 is apertured to receive that end of the button 62 which provides the end face 65 so that the enlargement 63 can abut the end face 65 of the button 62. A coil spring 72 is operative between an extension 75a of the lever arm 68 and a portion of the housing 46 for rotating the lever arm 68 in a counterclockwise direction about the pin 73 and maintaining operative engagement of the end 69 of the lever arm 68 with the stem 36. Upon the lever arm 68 overcoming the bias of the valve spring 34 the valve member 30 is disengaged from its seat 32. A fulcrum for the lever 68 is provided by the end surface 75 of a push-rod 74 reciprocable in the support plate 55 and forming the operating member of a timing mechanism or other condition controlling means which, as indicated in broken lines in the drawing, may comprise an electric clock 76.

The clock 76 may be utilized for governing the length of the cooking operation and may be detachably secured to the support plate 55 by engagement with snap buttons 78 yieldably mounted on the support plate 55. The clock 76 operates the push-rod 74 to a downward position, as shown in the drawing, to cause closure of the valve member 30 by the lever 68. In the retracted position of the push-rod 74 the coil spring 72 serves to rotate the lever 68 counterclockwise about the pivot pin 73 and cause the valve member 30 to open against the bias of the spring 34. It will be noted that the timing mechanism operates independently of the safety device 42 and can be added or removed without affecting operation of the control device 22 under full safety control. The lever 70 is pivoted at one end on a pin 71 carried by a support 80 depending from the underside of the support plate 55. The free end of the lever 70 engages with an annular recessed portion 82 of the enlargement 63 of the reset stem 60 which upon reciprocation thereof will serve to rotate the lever 70 about the pin 71.

This invention is more particularly directed toward means to control the operation of the control device 22 according to the internal temperature of the contents of a container supported within the compartment 14. The temperature responsive device provided for this purpose is operative for causing movement of the armature 48 of the safety device 42 to a released position by overcoming the magnetic force of the magnet 44 which holds the armature 48 in the attracted position. Such temperature responsive device has a bulb portion 84, a capillary tubing 86 and an expansible actuating element 88 providing a closed system which is completely filled with a suitable fluid which will expand and contract in response to temperature changes sensed by the bulb 84 and cause corresponding expansion and contraction of the actuating element 88. The bulb portion 84 is provided with a pointed end 87 forming a skewer point for insertion into the interior of meat or other food being roasted or broiled in the compartment 14. As indicated in broken lines in the drawings, a container 89 is supported within the compartment 14 and the bulb 84 is adapted by reason of the flexible nature of the capillary tubing 86 to be inserted into the interior of the contents, such as a roast, in the container 89.

The actuating element 88 is mounted on one leg 89 of a U-shaped bracket 90 which is secured to the support plate 55 above the lever arms 68 and 70 by means of a strap 92. This fastening means is sufficiently loose to permit the bracket 90 to slide a limited amount in a direction parallel to the length of the support plate 55 thus providing a carriage for the actuating element 88. The opposite leg 85 of the bracket 90 is bifurcated for the reception of an upturned arm 93 carried by the lever 70 and projecting through the support plate 55. The actuating element 88 is here shown as being of conventional design and comprising a pair of flexible diaphragm elements 88a, 88b with their peripheral portions secured together. The space between the diaphragm elements is maintained in communication with the capillary tubing 86 through a hollow stud 88c which is secured by welding or the like to the diaphragm element 88a and which extends along the axis thereof extended. The stud 88c is slidably received in a suitable aperture formed in the leg 89 of the bracket 90 and a nut 88d threaded on the end of the stud is engageable with the leg 89 to limit movement of the actuating element 88 to the left as viewed in the drawings. A coil spring 94 acts between the leg 89 of the bracket 90 and the diaphragm element 88a to urge the actuating element 88 to the left as viewed in the drawings. A suitable abutment 88e is carried on the diaphragm element 88b for engagement with the arm 93 of the lever 70 upon expansion of the diaphragm elements 88a, 88b. It will be apparent that expansion of the diaphragm elements will cause initial movement of the abutment 88e to the left as viewed in the drawings. When further movement of the abutment 88e to the left is inhibited, as for example by engagement of the diaphragm element 88b with the bifurcated arm 85, further expansion of the diaphragm elements 88a, 88b will cause compression of the spring 94 and slidable movement of the stud 88c to the right. Thus, an override device is provided for preventing damage upon excessive expansion of the element 88.

Means for varying the temperature setting at which the control means 22 will be operative is provided in connection with the internal temperature control device and is indicated generally by the reference numeral 91. This means is effective for moving the bracket 90 to adjust the position of the actuating element 88 relative to the upturned arm 93 projecting from the lever 70. One form of adjusting means shown in Figs. 1 to 4 comprises a cam element 96 rotatably mounted on the support plate 55 for operative engagement with a projection 98 on the base of the bracket 90. An operating arm 100 is carried by the cam 96 and projects beyond the front edge of the support plate 55 to provide manually adjustable indicator means 102 cooperable with an arcuate indicator plate 104 carried on the support plate 55. As indicated in Fig. 4 of the drawings, the indicator plate 104 is provided with indicia ranging from 100 to 200 degrees Fahrenheit with the "off" position beyond the highest temperature setting. It will be apparent that if required, a spring or other means could be employed to bias the bracket 90 against the cam means 96.

In the operation of the device shown in Figs. 1 to 4 inclusive, the condition controlling means such as the electric clock 76 may terminate the cooking period by closing the valve member 30 which is shown in this position with main burner 10 shut off. In this valve closing operation, the push-rod 74 is forced downwardly by the clock actuator so that the lever 68 is rotated clockwise about its pivot 73. The end 69 of the lever 68 which operatively engages the stem 36 is raised during this clockwise movement of the lever 68 thus allowing valve spring 34 to close the valve member 30. On the other hand, when the clock 76 operates to open the valve member 30 the downward force on the push-rod 74 is removed. The coil spring 72 then rotates the lever 68 counter-clockwise and causes movement of the valve member 30 from its seat 32 against the bias of the valve spring 34.

To place the device in operation the bulb 84 is inserted with its skewer point 87 into the interior of the contents of the container 89 and the adjustable indicator 102 is set to the temperature at which it is desired to have the control means 22 operate to shut off the fuel supply to the main burner 10. The usual oven thermostat (not shown) is set to the temperature which it is desired to maintain in the compartment 14. The time at which the heating operation is to start may be controlled by the setting of the clock 76 or, where this automatic means is dispensed with, such operation may be performed manually. In any event, the pilot burner 12 being in this embodiment of the constant burning type may be assumed to be lighted and the thermocouple 52 is therefore heated sufficiently to generate current for holding the armature 48 in attracted position.

The push-button 54 is then manually operated to cause the bell-crank 66 to force the button 62 on the reset stem 60 downwardly as viewed in Fig. 1 and after a relatively short movement in this direction, the collar 64 on the button 62 contacts a suitable bearing surface formed on the lever 68 (here shown as a depressed portion 83) it being understood that the push-rod 74 is in its retracted position and not being forced downwardly by the clock 76. The lever 68 consequently is moved in a clockwise direction causing the coil spring 72 to be compressed. The downward movement of the button 62 causes engagement of the face 65 of the button with the enlargement 63 to move the reset stem 60 and cause the coil spring 50 also to be compressed. During this resetting operation, the other lever 70 is also being rotated clockwise as described so that both levers 68 and 70 rotate as a unit about the support 80. The armature 48 is thus reset in attracted position relative to the pole faces of the magnet 44 and is retained in such position by the magnetic attraction of the magnet 44 until the pilot burner 12 is again extinguished or until the internal temperature responsive device operates to shut off the flow of heat. Retention of the armature 48 in its attracted position will cause retention of the reset stem 60 in its depressed position with the spring 50 compressed as shown in Fig. 3.

When the push-button 54 is released after the resetting operation is completed, the reset stem 60 and the lever 70 are held in the downward position by the operation of the safety device 42 as shown in Fig. 3. The telescopic connection of the push button 54 and the reset stem 60 permits relative movement therebetween. Consequently, the coil spring 72 rotates the lever 68 counterclockwise about its pivot and by its engagement with the collar 64 causes the push button 54 to assume its initial position. The lever 68 also causes the valve member 30 to be disengaged from its seat 32 against the bias of the spring 34 due to pressure exerted on the operating stem 36. The fuel issuing from the main burner 10 is lighted by the pilot burner 12 and the cooking operation proceeds under control of the conventional oven thermostat.

When the actuating element 88 of the internal temperature control device expands as a result of the increase in temperature sensed by the bulb 84, the abutment 88e approaches the bifurcated arm of the bracket 90. Sufficient movement of the abutment 88e in this direction upon the set temperature of the indicator plate 104 being reached will cause engagement of the abutment 88e with the upturned arm 93 of the lever 70. Such engagement occurs with sufficient force to cause the free end of the lever 70 to pull the armature 48 into released position by overcoming the magnetic force of the magnet 44. The armature movement is assisted by the coil spring 50 which biases the armature 48 to released position. The operation is similar to the normal operation of the safety device 42 in the event that the flame from the pilot burner 12 is extinguished.

The release of the armature 48 results in a valve closing operation. The reset stem 60 is moved upwardly, as viewed in Fig. 1, so that the described engagement between the enlargement 63 of the stem 60 and the end face 65 of the button 62 occurs. The lever 70 is consequently rotated counterclockwise about the support 80 causing its pivot connection with the lever 68 to be raised. The lever 68 is thus caused to rotate about the push-rod 74 as a fulcrum and to remove the force which this lever 68 exerts on the valve member 30. The valve member 30 thereupon closes under bias of the valve spring 34. In the event that the push-rod 74 is being forced downwardly to close the valve member 30 by operation of the clock 76 at the time that the armature 48 is forced into released position, then the valve member 30 is initially closed. The lever 70 nevertheless rotates as described and causes the lever 68 to move still farther. Thus, if the clock 76 releases pressure on the push-rod 74 the valve member 30 cannot open.

When the adjustable indicator 102 is moved up past the maximum temperature setting to the "off" position, the bifurcated arm 85 of the bracket 90 will be disposed to the right of the upturned arm 93 of the lever 70 and the diaphragm 88b will therefore contact the bifurcated arm 85 of the bracket 90 before the upturned arm 93 of the lever 70 is contacted by the abutment 88e. Consequently, the internal temperature control means is rendered inoperative and the oven compartment 14 may be used for other operations. It is apparent that after the actuating element 88 has expanded sufficiently to contact the bifurcated arm 85 of the bracket 90, further expansion of the actuating element 88 merely compresses the override spring 94. It will be observed that the shape of the cam element 96 is such that as the operating arm 100 is moved toward the higher temperature setting shown on the indicator plate 104 the bracket 90 is permitted to move to the right, as shown in Fig. 2, so that the actuating element 88 must expand farther before contacting the upturned arm 93 of the lever 70. This movement of the bracket 90 to the right does not necessarily take place immediately. However, if the bracket 90 is not in contact with the cam means 96, the abutment 88e contacts the upturned arm of the lever 70 before the desired temperature is reached but can apply no appreciable force. Thus, instead of forcing the armature 48 to released position, further expansion of the actuating element 88 merely pushes the bracket 90 to the right until the projection 98 on bracket 90 contacts the cam means 96. Thereupon, the actuating element 88 is able to apply a force to the upturned arm 93 of the lever 70.

Upon opening of the door of the compartment 14 and withdrawal of the bulb portion 84 from the contents of the container 89, the latter can be removed from the compartment 14. The bulb portion 84 is left in the compartment 14 and cannot be misplaced or lost as a removable thermometer device might be. Moreover, the device is always available for use at the desired location.

In the modification shown in Figs. 5 to 8 inclusive similar reference numerals have been used for corresponding parts and further description thereof is considered unnecessary. This modification differs from the preferred embodiment shown in Figs. 1 to 4 by the provision of a different mode of accomplishing the adjustment of the internal temperature control device and by providing visual indication of the condition of the safety means 42. Thus, the upstanding arm 93 of the lever 70 is engaged by one end of a link member 106. The opposite end of the link member 106 is engaged with an indicator arm 108 pivotally mounted at one end on the support plate 55 and having its opposite end provided with an arcuate plate 110 carrying the indicia "on" and "off." A pair of stop pins 112 project from the support plate 55 and are spaced one from the other on either side of the indicator arm 108 to limit pivotal movement thereof into position for displaying either of the indicia through a window 114 formed in the front casing of the clock 76.

A casing 116 of sheet material is provided to enclose the indicating mechanism and the resetting means. This casing 116 has crimped projecting ends 118 which extend through suitable apertures in the support plate 55 and serve as resilient locking means to detachably retain the casing 116 in position. An aperture 120 is provided in the top of the casing 116 through which the push-rod 74 may project and, similarly, apertures 122 and 124 are provided in the front thereof through which the push-button 54 may project and the indicia on the arcuate plate 110 may be viewed through the window 114, respectively.

The casing 116 serves to support the temperature responsive device of this embodiment which is responsive to the internal temperature of the contents of the container 89. The temperature responsive device of this embodiment comprises the bulb element 84, the capillary tube 86 and an actuating element 126. The bulb element 84 and capillary tube 86 are located exterior of the casing 116 while the actuating element 126 depends from the underside of the casing 116 on the interior thereof. The element 126 is secured to the casing 116 in overlying relationship with a projection 128 formed on the lever 70 and which is suitably apertured to permit the operating stem 36 for the valve member 30 to project therethrough. The actuating element 126 is provided with the usual override spring 130 operative between the actuating element 126 and the underside of the casing 116. An extension member 132 is threaded upon the actuating element 126 and is thus reciprocable relative thereto. The extension member 132 extends into operative engagement with the projection 128 of the lever 70. An operating arm 134 is secured to the extension 132 overlying the support plate 55 and extending to the forward edge thereof to form an adjustable indicating means 136. The indicator 136 cooperates with an arcuate plate 138 upon which temperature indicia are marked and which are in all respects similar to the temperature indicia in the previous embodiment. A cam element 140 is carried by the support plate 55 on one side of the arm 134 when the latter is in its median position shown in Fig. 6 of the drawing. A window 142 is provided in the front of the casing 116 through which the temperature indicia on plate 138 may be viewed and a similar window 143 is provided in the front casing of the clock 76 in oppositely disposed relation.

When the arm 134 is moved up to the "off" position it rides up the cam 140 so that it is held in an inactive position. Expansion of the actuating element 126 is then taken up by the override spring 130. The operation of the device disclosed in Figs. 5 to 8 inclusive will be evident from the description given in connection with Figs. 1 to 4 inclusive. Thus, when the actuating element 126 expands upon an increase in temperature sensed by the bulb element 84 then the extension 132 exerts a force downwardly upon the lever 70 and thereby pulls the armature 48 into its released position. This operation will cause the free end of the lever 70 which is engaged with the recessed portion 82 of the reset stem 60 to move counterclockwise as in the previous embodiment. Consequently, the upturned portion 93 of the lever 70 moves to the left as viewed in Fig. 6 and reverses the position of the plate 110 through the linkage described. The indicia "off" then appears in the window 114 indicating to the operator that the desired temperature has been reached.

It will be observed that the indicia "on" on the plate 110 does not, of course, change during a normal cooking operation when the clock operates the lever 68 only and causes opening and closing of the valve member 30 to control the main burner 10. It is only when the armature 48 moves to its released position and operates the lever 70 that the indicia is changed from "on" to "off" indicating that the safety means is no longer effective. Such release of the armature 48 may occur due to extinguishment of the pilot burner 12 as well as by operation of the internal temperature control device described.

It will be apparent that in either of the embodiments described, after the cooking operation is complete the bulb 84 may be removed from the contents of the container 89, the operating arm 100 or 134 moved up to the "off" position and the push-button 54 operated to reset the armature 48 against the pole faces of the magnet 44. The heating appliance is then available for other cooking purposes while the bulb element 84 may be left in the compartment 14 as described.

It is understood that many changes may be made in the combination and arrangement of parts and in the details of construction within the scope of the appended claims without departing from the invention disclosed herein.

We claim:

1. A control device for heating means for heating the contents of a container, comprising in combination, control means movable between positions for controlling the flow of a heat producing medium to the heating means, means for biasing said control means to a position wherein said flow is prevented, electromagnetic means having an armature movable between attracted and released positions, means for biasing said armature to said released position, thermally responsive means for energizing said electromagnetic means sufficiently to prevent movement of said armature from said attracted position but insufficiently to cause movement thereof from said released position, reset means for overcoming the last said biasing means and causing movement of said armature to said attracted position, manually operable means movable in one direction for operating said reset means and having limited slidable movement in the opposite direction relative thereto upon completion of the resetting operation, a lever device adapted to be positioned for operative engagement with said manually operable means and said control means for moving the latter to flow permitting position upon said limited slidable movement of said manually operable means, a temperature responsive device operable for causing movement of said armature to said released position and said control means to said flow preventing position, said device including a portion insertable into the contents of said container and adapted to be responsive to the internal temperature thereof for exerting a force on said lever device.

2. A control device as claimed in claim 1 wherein said lever device has a projecting portion, said temperature responsive device having an expansible element engageable with said projection for rotating said lever device sufficiently to release said armature.

3. A control device as claimed in claim 2 wherein said control and electromagnetic means are carried on one side of a support, said projecting portion of said lever device extending through said support to the opposite side thereof, a movable bracket carried by said support adjacent said projection, cam means rotatably mounted on said support for operative engagement with said bracket, and manually adjustable indicator means cooperable with said cam means for positioning said bracket relative to said projection.

4. A control device as claimed in claim 1 wherein said lever device has a projecting portion, said temperature responsive device having an expansible element engageable with said projection for rotating said lever device sufficiently to release said armature, a carriage for said temperature responsive device, and means for moving said carriage to adjust the position of said element relative to said projection and thereby vary the temperature setting of said control means.

SAMUEL G. ESKIN.
HAROLD W. RICE.

REFERENCES CITED

The following references are of record in the file of this patent:

UNITED STATES PATENTS

| Number | Name | Date |
|---|---|---|
| 1,804,129 | Starr | May 5, 1931 |
| 1,945,390 | Baker | Jan. 30, 1934 |
| 2,303,702 | Mantz | Dec. 1, 1942 |
| 2,414,220 | Alfery | Jan. 14, 1947 |